United States Patent

Baldauf et al.

(10) Patent No.: US 8,340,885 B2
(45) Date of Patent: Dec. 25, 2012

(54) METHOD FOR CONTROLLING A STATIONARY GAS MOTOR

(75) Inventors: Johannes Baldauf, Wangen (DE); Ludwig Kläser-Jenewein, Frickingen (DE); Peer Smuda, Sindelfingen (DE)

(73) Assignee: MTU Friedrichshafen GmbH, Friedrichshaften (DE)

( * ) Notice: Subject to any disclaimer, the term of this patent is extended or adjusted under 35 U.S.C. 154(b) by 455 days.

(21) Appl. No.: 12/679,476

(22) PCT Filed: Sep. 19, 2008

(86) PCT No.: PCT/EP2008/007891
§ 371 (c)(1),
(2), (4) Date: May 19, 2010

(87) PCT Pub. No.: WO2009/040058
PCT Pub. Date: Apr. 2, 2009

(65) Prior Publication Data
US 2010/0256890 A1    Oct. 7, 2010

(30) Foreign Application Priority Data

Sep. 21, 2007   (DE) ................. 10 2007 045 195

(51) Int. Cl.
*F02B 43/00* (2006.01)
*F02B 43/04* (2006.01)

(52) U.S. Cl. .................................... 701/103; 123/527

(58) Field of Classification Search .......... 701/103, 701/104, 102, 101; 123/527, 528, 27 GE, 123/478, 480
See application file for complete search history.

(56) References Cited

U.S. PATENT DOCUMENTS

| | | | |
|---|---|---|---|
| 4,977,508 A * | 12/1990 | Tanaka et al. | 701/111 |
| 5,864,770 A * | 1/1999 | Ziph et al. | 701/110 |
| 6,189,523 B1 | 2/2001 | Weisbrod et al. | |
| 6,340,005 B1 | 1/2002 | Keast et al. | |
| 2002/0113439 A1 * | 8/2002 | Thomas et al. | 290/40 A |

FOREIGN PATENT DOCUMENTS

EP   1323913   7/2003

* cited by examiner

*Primary Examiner* — Mahmoud Gimie
(74) *Attorney, Agent, or Firm* — Lucas & Mercanti, LLP; Klaus. P. Stoffel

(57) ABSTRACT

The invention proposes a method for controlling a stationary gas motor (1), wherein a rotational speed control deviation is calculated from a target rotational speed (nSL) and a current rotational speed (nIST), a target torque is determined from the rotational speed control deviation as the controlled variable, wherein a mixture throttle angle (DKW1, DKW2) is determined for the determination of a mixture volume flow and of a current mixture pressure (p1 (IST), p2(IST)) in a receiver pipe (12, 13) upstream of the intake valves of the gas motor (1) as a function of the target volume flow, and wherein a gas throttle angle is determined for determining a gas volume flow as the gas content in a gas/air mixture, also as a function of the target volume flow.

7 Claims, 4 Drawing Sheets

METHOD FOR CONTROLLING A STATIONARY GAS MOTOR

This application is a 371 of PCT/EP2008/007891 filed Sep. 19, 2008. Priority is claimed on that application, and on the following application:

Country: Germany, Application 10 2007 045 195.6, filed Sep. 21, 2007. The entire contents of these applications are incorporated herein by reference.

BACKGROUND OF THE INVENTION

The invention concerns a method for automatically controlling a stationary gas engine, in which a speed control deviation is computed from a set speed and an actual speed, the speed control deviation is used by a speed controller to determine a set torque as a correcting variable, and the set torque is used to determine a set volume flow. In addition, the method consists in determining a mixture throttle angle for determining a mixture volume flow and for determining an actual mixture pressure in a receiver tube upstream of the intake valves of the gas engine as a function of the set volume flow. The invention further consists in determining a gas throttle angle for determining a gas volume flow as the gas fraction in a gas/air mixture, likewise as a function of the set volume flow.

Stationary gas engines are often used to power emergency generators or rapid-readiness units. In this connection, the gas engine is operated at a lambda value of, for example, 1.7, i.e., a lean mixture with excess air. The gas engine typically includes a gas throttle for setting the gas fraction in the gas/air mixture, a mixer for mixing the combustible gas and the air, a compressor as part of an exhaust gas turbocharger, a cooler, and a mixture throttle. The intake volume flow in the receiver tube upstream of the intake valves of the gas engine is set by the mixture throttle, and thus the mixture pressure in the receiver tube is also set.

EP 1 158 149 A1 describes a stationary gas engine for driving a generator. The gas engine is controlled by using a characteristic curve to compute a set lambda as a reference output from the engine output. On the basis of the set lambda, an electronic engine control unit computes a gas quantity set value, by which the gas throttle is then suitably adjusted. In a second embodiment, the set lambda value is computed from a mixture pressure control deviation. The mixture pressure control deviation is determined from the detected actual mixture pressure in the receiver tube and the set mixture pressure, which in turn is determined from the engine output by means of a characteristic curve. In a third embodiment, as a supplement to the second embodiment, the gas quantity set value is corrected to adjust the gas throttle as a function of the position of a compressor bypass valve and the speed control deviation. A common feature of all three embodiments is the adjustment of the gas throttle to a set lambda value. In practical operation, this means that when a change in the power assignment is made, first a change is made in the position of the mixture throttle as the power control element. This has the effect that the intake mixture volume flow also changes. Since the position of the gas throttle initially remains constant, there is also no change in the gas volume flow. This results in a changing actual lambda. When a mixture throttle is controlled to move, for example, in the closing direction, this causes enrichment of the mixture, which results in a change in output of the gas engine. As a response to this change in output, the set lambda value, the gas quantity set value, and the position of the gas throttle are then changed. In this type of automatic control, the response time, for example, when the load changes, is critical, since intervention in the lambda control is sluggish due to the system itself.

DE 103 46 983 A1 also describes a gas engine and a method for automatically controlling the fuel mixture. In this method, in a first step, an actual pressure difference of the air mass flow is determined in a venturi mixer, and, in a second step, a set pressure difference of the air mass flow is determined from the measured actual output of the gas engine. In a third step, the actual pressure difference is then brought closer to the set pressure difference by changing the amount of gas supplied by changing the position of the gas throttle. In a fourth step, the actual gas engine output that develops is detected again, and the mixture throttle is adjusted in such a way that the set/actual deviation of the pressure difference of the air mass flow in the venturi mixer is reduced. This sequential order of operations is carried out iteratively until the set/actual deviation of the pressure difference is smaller than a limit. Since a change in the position of the mixture throttle produces a change in the output of the gas engine, the position of the gas throttle must be readjusted to compensate the change in output of the gas engine. Under certain circumstances, this can cause the correcting variables to overshoot.

SUMMARY OF THE INVENTION

The objective of the invention is to design a method for automatically controlling a stationary gas engine with improved control performance.

This objective is achieved by a method in which a speed control deviation is computed from a set speed and an actual speed, the speed control deviation is used by a speed controller to determine a set torque as a correcting variable, and the set torque is then used to determine a set volume flow. A mixture throttle angle for determining a mixture volume flow and for determining an actual mixture pressure in a receiver tube upstream of the intake valves of the gas engine is in turn determined as a function of the set volume flow. A gas throttle angle for determining a gas volume flow as the gas fraction in a gas/air mixture is likewise determined as a function of the set volume flow. The central idea of the invention is thus the parallel control of the gas throttle and the mixture throttle as a function of the same actuating variable, in this case, the set volume flow. Advantages include not only a shortened response time but also a more precise transient oscillation with improved adjustability of the total system. In addition, due to the parallel control, lambda tracking is not necessary. All together, the invention allows uniform automatic control of the engine output.

The set volume flow is computed from the set torque by limiting the set torque and assigning the set volume flow to the limited set torque by an engine map as a function of the actual speed. The set torque is limited as a function of the actual speed and, in addition, as a function of a detected fault state of the system, for example, a sensor failure. A permissible mechanical maximum torque is also taken into account. The limitation of the set torque improves the operating reliability of the total system.

The mixture throttle angle is determined by computing a set mixture pressure from the set volume flow, determining a mixture pressure control deviation from the set mixture pressure and an actual mixture pressure in the receiver tube, and using the mixture pressure control deviation to compute, by means of a mixture pressure controller, a correcting variable for determining the mixture throttle angle. The computation of the set mixture pressure involves the use not only of the system constants but also, for example, the stroke volume, a set lambda, and a mixture temperature in the receiver tube.

In a V-type gas engine, the method provides that a first mixture throttle angle is computed for the A side for determining a first mixture volume flow and a first actual mixture pressure in a first receiver tube and that a second mixture throttle angle is computed for the B side for determining a second mixture volume flow and a second actual mixture pressure in a second receiver tube.

BRIEF DESCRIPTION OF THE DRAWINGS

The drawings show a preferred embodiment

DETAILED DESCRIPTION OF THE INVENTION

Figure 1:
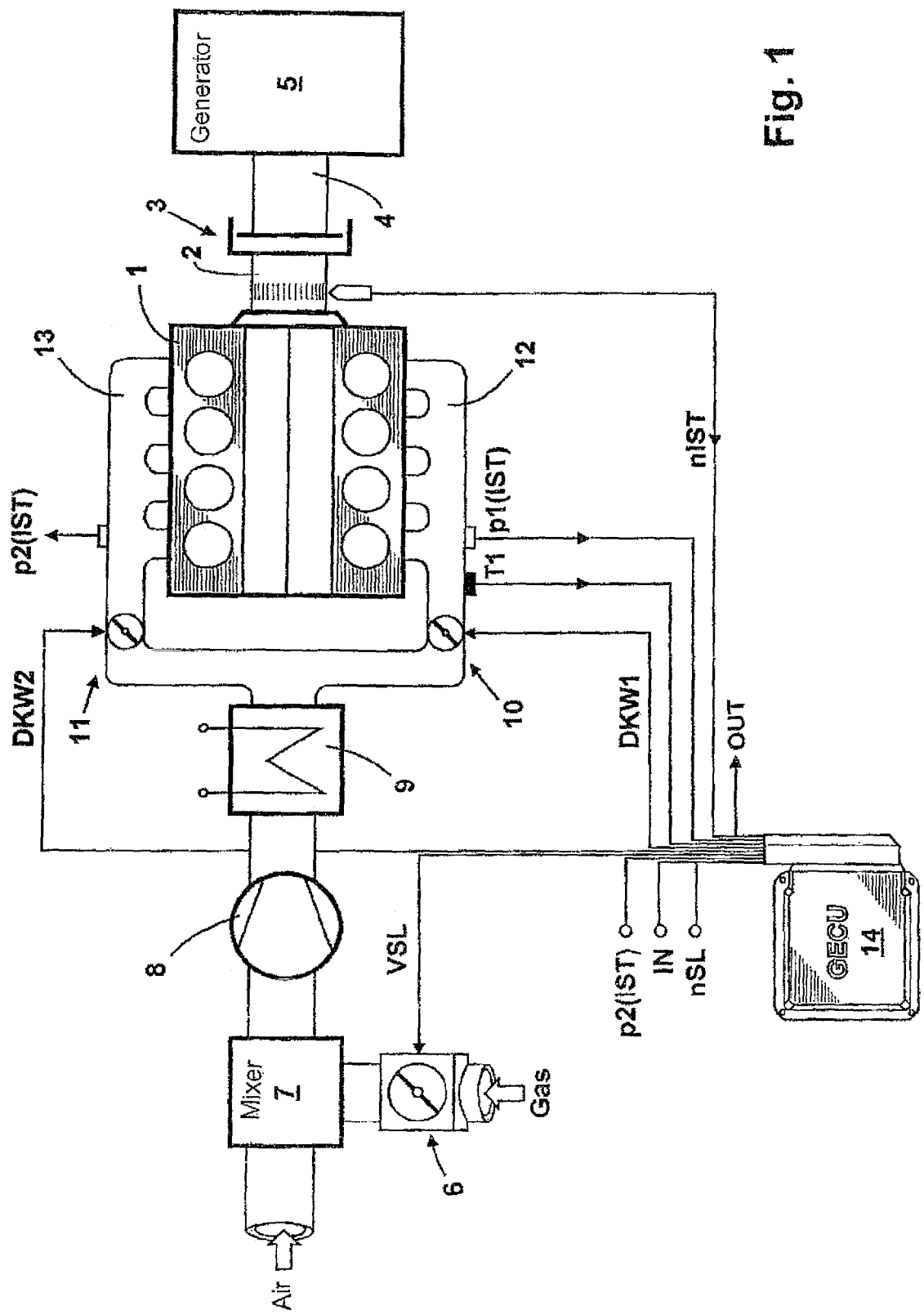
FIG. 1 is a total system diagram.

FIG. 1 shows a total system diagram of a stationary gas engine 1 with a V configuration. The gas engine 1 drives a generator 5 via a shaft 2, a coupling 3, and a shaft 4. The generator 5 generates electric power, which is fed into an electric network. The following mechanical components are assigned to the gas engine 1: a gas throttle 6 for setting a supply volume flow of gas, for example, natural gas; a mixer 7 for mixing air and gas; a compressor 8 as part of an exhaust gas turbocharger; cooler 9; a first mixture throttle 10 on the A side of the gas engine 1; and a second mixture throttle 11 on the B side of the gas engine 1.

The operating mode of the gas engine 1 is determined by an electronic gas engine control unit 14 (GECU). The electronic engine control unit 14 contains the usual components of a microcomputer system, for example, a microprocessor, interface adapters, buffers, and memory components (EEPROM, RAM). Operating characteristics that are relevant to the operation of the gas engine 1 are applied in the memory components in the form of engine maps/characteristic curves. The electronic engine control unit 14 uses these to compute the output variables from the input variables. FIG. 1 shows the following input variables: a first actual mixture pressure p1(IST) and a mixture temperature T1, both of which are measured in the first receiver tube 12, a second actual mixture pressure p2(IST), which is measured in the second receiver tube 13, an actual engine speed nIST of the gas engine 1, a set speed nSL, which is preassigned by a system controller (not shown) of the generator 5, and an input variable IN. The other input signals, for example, the oil temperature, are combined as the input variable IN. FIG. 1 also shows the following output variables of the electronic engine control unit 14: the signal of a set volume flow VSL for controlling the gas throttle 6, the signal of a first mixture throttle angle DKW1 for controlling the first mixture throttle 10, the signal of a second mixture throttle angle DKW2 for controlling the second mixture throttle 11, and a signal OUT. The signal OUT is representative of the other signals for regulating and controlling the gas engine 1.

The system has the following general functionality: A gas volume flow supplied to the mixer 7 is adjusted by the position of the gas throttle 6. The position of the first mixture throttle 10 defines a first mixture volume and thus the first actual mixture pressure p1(IST) in the first receiver tube 12 upstream of the intake valves of the gas engine 1. The second mixture throttle 11 determines a second mixture volume and thus the second actual mixture pressure p2(IST) in the second receiver tube 13 upstream of the intake valves of the gas engine 1.

Figure 2:
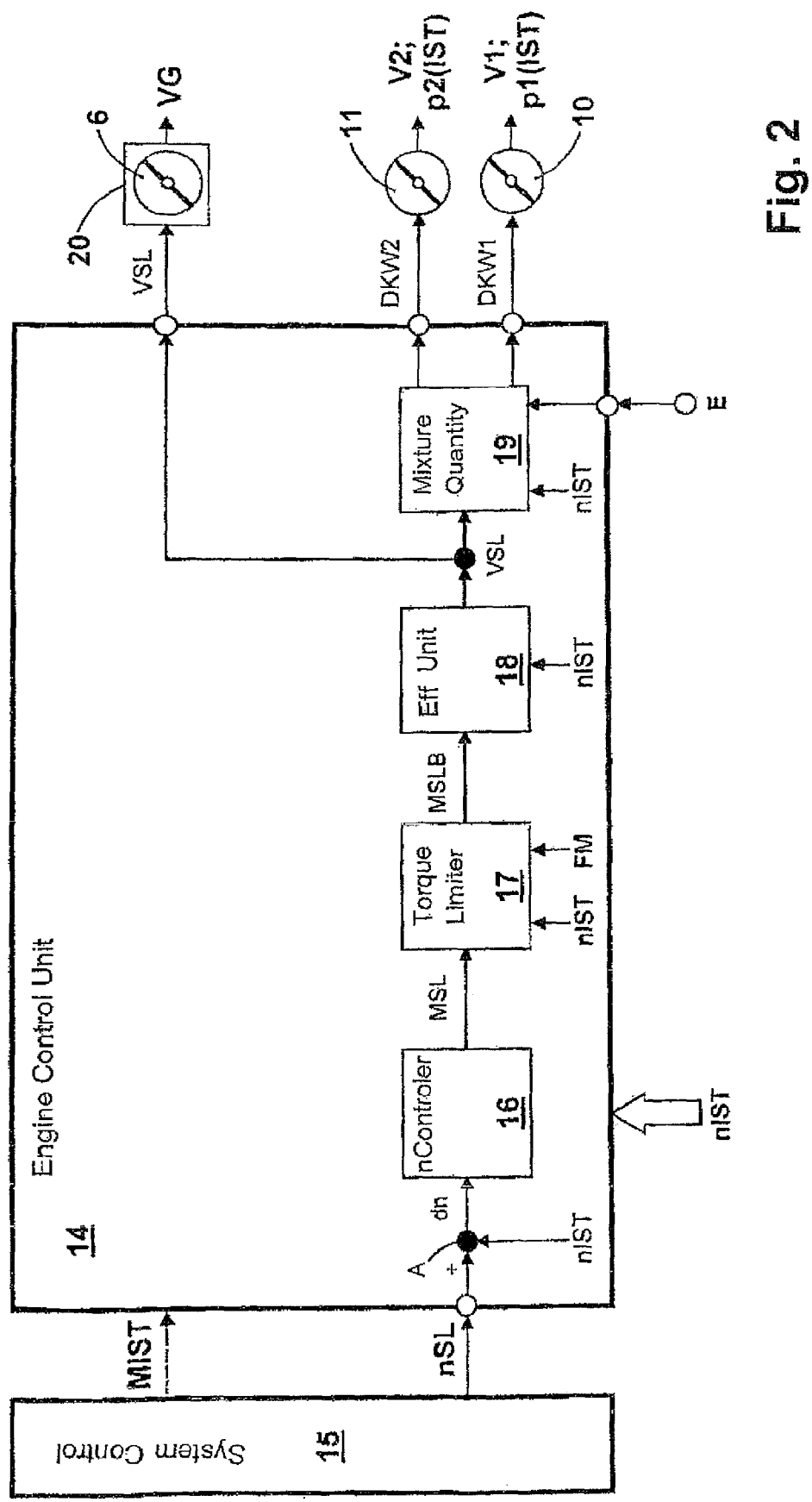
FIG. 2 is a functional block diagram for controlling the gas throttle and the mixture throttles.

FIG. 2 shows a functional block diagram for controlling the two mixture throttles 10 and 11 and the gas throttle 6. The system controller of the generator is identified by reference number 15. Reference number 14 identifies the electronic engine control unit in the form of a reduced block diagram, in which the depicted elements represent the program steps of an executable program. The input variables of the electronic engine control unit 14 in this representation are the set speed nSL and optionally an actual torque MIST, which are supplied by the system controller 15, the actual speed nIST, and an additional variable E. The additional variable E combines the following: a set lambda, a stroke volume of the cylinders of the gas engine, the volumetric efficiency in terms of a cylinder cutoff, and the fuel quality. The output variables are the first mixture throttle angle DKW1 for controlling the first mixture throttle 10, the second mixture throttle angle DKW2 for controlling the second mixture throttle 11, and the set volume flow VSL for controlling the gas throttle 6.

The set speed nSL, for example, 1,500 rpm, which corresponds to a frequency of 50 Hz, is preset by the system controller 15 as the desired output. At a point A, a speed control deviation dn is computed from the set speed nSL and the actual speed nIST. A speed controller 16 uses the speed control deviation do to compute a set torque MSL as a correcting variable. In practice, the speed controller 16 is realized as a PIDT1 controller. A torque limiter 17 limits the set torque MSL to a minimum and maximum value. The output value represents a limited set torque MSLB. The parameters for the limits of the torque limiter 17 are the actual speed nIST and a fault signal FM, which is set when an error in the total system is detected, for example, if a defective pressure sensor is detected. A permissible mechanical maximum torque can also be provided as an additional parameter. If the value of the set torque MSL is in the permitted range, then the value of the limited set torque MSLB is the same as the value of the set torque MSL. A set volume flow VSL is assigned by an efficiency unit 18 to the limited set torque MSLB as a function of the actual speed nIST. For this purpose, a suitable engine map is stored in the efficiency unit 18. The set volume flow VSL is the input variable of the mixture quantity unit 19 and at the same time is the input variable of the gas throttle 6. The mixture quantity unit 19 computes the first mixture throttle angle DKW1 and the second mixture throttle angle DKW2 from the set volume flow VSL as a function of the actual speed nIST and the input variable E. The mixture quantity unit 19 will be explained in greater detail in connection with FIG. 3. The first mixture throttle 10 is controlled with the first mixture throttle angle DKW1. The first mixture throttle 10 sets a first mixture volume flow V1 and the first actual mixture pressure p1(IST). The second mixture throttle 11 is controlled with the second mixture throttle angle DKW2 and sets a second mixture volume flow V2 and the second actual mixture pressure p2(IST). The gas throttle 6 is also controlled with the set volume flow VSL. The gas throttle 6 has an integrated electronic processing unit 20, by which the value of the set volume flow VSL is assigned a corresponding cross-sectional area and a corresponding angle. The gas throttle 6 sets a gas volume flow VG as the gas fraction of the gas/air mixture.

As shown in FIG. 2, the two mixture throttles 10 and 11 and the gas throttle 6 are controlled parallel to each other as a function of the same setpoint value, in this case, the set volume flow VSL. Compared to the prior art with sequential control and lambda tracking, the method of the invention offers the advantages of a shortened response time and a more precise transient oscillation with improved adjustability of the total system. In addition, due to the parallel control, lambda tracking is not necessary. All together, the invention allows uniform automatic control of the engine output.

Figure 3:
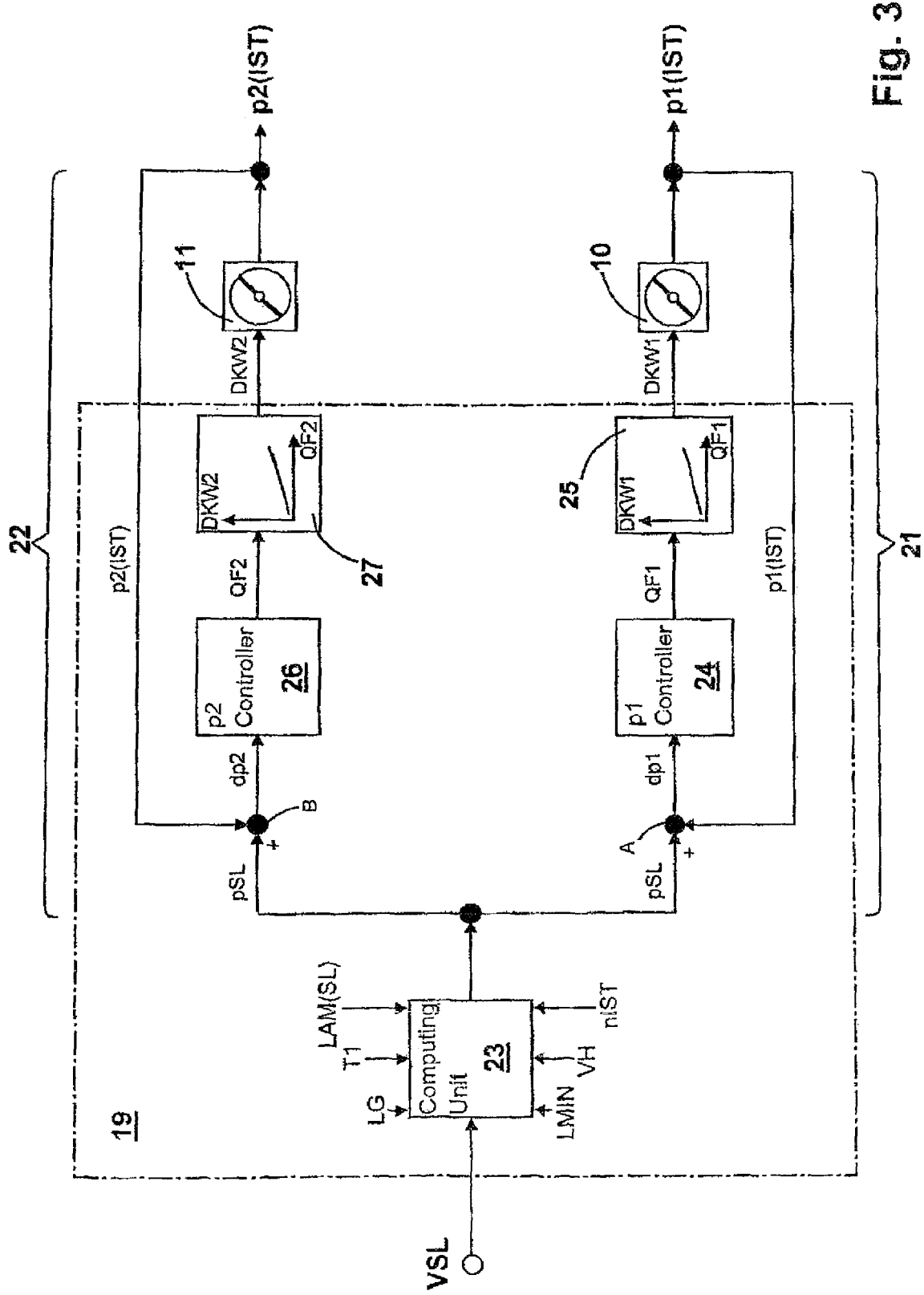
FIG. 3 is a closed-loop control system for the automatic control of the mixture pressure.

FIG. 3 shows a first closed-loop control system 21 for automatically controlling the first actual mixture pressure p1(IST) in the first receiver tube and a second closed-loop control system 22 for automatically controlling the second actual mixture pressure p2(IST) in the second receiver tube. Reference number 23 identifies a computing unit for computing the set mixture pressure pSL. The input variable of the first closed-loop control system 21 is the set mixture pressure pSL. The output variable of the first closed-loop control system 21 is the first actual mixture pressure p1(IST). The first closed-loop control system 21 comprises a comparison point A, a first mixture pressure controller 24, a first characteristic curve 25, and, as the controlled system, the first mixture throttle 10 for determining the supplied mixture volume flow and the first actual mixture pressure p1(IST). The input variable of the second closed-loop control system 22 is also the set mixture pressure pSL. The output variable of the second closed-loop control system 22 is the second actual mixture pressure p2(IST). The second closed-loop control system 22 comprises a comparison point B, a second mixture pressure controller 26, a second characteristic curve 27, and, as the controlled system, the second mixture throttle 11 for determining the supplied mixture volume flow and the second actual mixture pressure p2(IST). The computing unit 23, the two comparison points (A, B), the two mixture pressure controllers (24, 26), and the two characteristic curves (25, 27) are integrated in the mixture quantity unit 19, as is indicated by a dot-dash line.

The computing unit 23 computes the set mixture pressure pSL from the preset volume flow VSL by the following formula:

$$pSL = \{VSL \cdot 2[1 + LMIN - LAM(SL)] \cdot T1 \cdot pNORM\} / [nIST \cdot VH \cdot LG \cdot TNORM]$$

where:
pSL set mixture pressure
VSL set volume flow
LMIN fuel quality
LAM(SL) set lambda
T1 temperature in the first receiver tube
pNORM standard air pressure at mean sea level (1,013 mbars)
nIST present actual speed
VH stroke volume of the engine
LG volumetric efficiency (cylinder cutoff)
TNORM standard temperature 273.15 K The set mixture pressure pSL is the reference input for the two closed-loop control systems 21 and 22. The set mixture pressure pSL is compared with the first actual mixture pressure p1(IST) at comparison point A. The result corresponds to the first mixture pressure control deviation dp1. The first mixture pressure controller 24, which is typically a PIDT1 controller, uses this control deviation dpi to compute a first cross-sectional area QF1 as a correcting variable. The first mixture throttle angle DKW1 is assigned to the first cross-sectional area QF1 by the first characteristic curve 25. The first mixture throttle 10, which is the controlled system, is then controlled with the first mixture throttle angle DKW1. The output variable of the first mixture throttle 10 is the first actual mixture pressure p1(IST), which is the controlled variable. The first actual mixture pressure p1(IST) is returned to the comparison point A through an optional filter (not shown). The first closed-loop control system 21 is thus closed.

The set mixture pressure pSL is compared with the second actual mixture pressure p2(IST) at comparison point B. The result corresponds to the second mixture pressure control deviation dp2. The second mixture pressure controller 26 uses this control deviation dp2 to compute a second cross-sectional area QF2 as a correcting variable, to which is assigned the second mixture throttle angle DKW2 by the second characteristic curve 27. The second mixture throttle 11, which is the controlled system, is then controlled with the second mixture throttle angle DKW2. The output variable of the second mixture throttle 11 is the second set actual mixture pressure p2(IST), which is the controlled variable. The second set actual mixture pressure p2(IST) is returned to the comparison point B through an optional filter (not shown). The second closed-loop control system 22 is thus closed.

Figure 4:
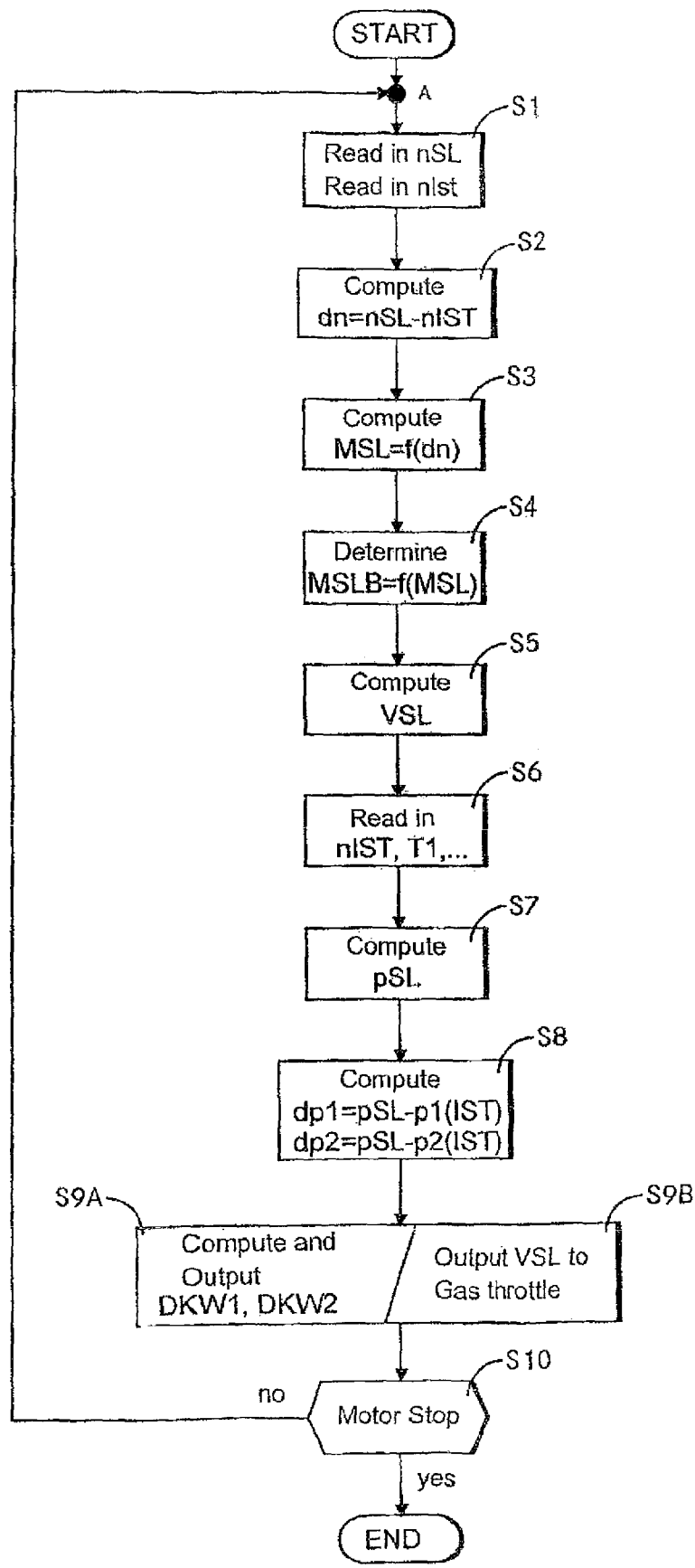
FIG. 4 is a program flowchart.

FIG. 4 is a program flowchart, which is part of the executable program implemented in the electronic gas engine control unit 14. At S1 the set speed nSL and the actual speed nIST are read in, and at S2 the speed control deviation dn is computed. At S3 the speed controller uses the speed control deviation dn to determine the set torque MSL as the correcting variable. The set torque MSL is then limited to an upper and a lower limit. The output value corresponds to the limited set torque MSLB. If the value of the set torque MSL lies within the permitted range, then the value of the limited set torque MSLB is the same as the value of the set torque MSL. At S5 the efficiency unit (FIG. 2, reference number 18) uses an engine map to assign a set volume flow VSL to the limited set torque MSLB as a function of the actual speed nIST. Then at S6 the value of the set volume flow VSL, the actual speed nIST, the temperature T1 in the first receiver tube, and the system constants are read in. At S7 the set mixture pressure pSL is computed by the computing unit (FIG. 3, reference number 23) with the formula described above. At S8 the first mixture pressure control deviation dp1 and the second mixture pressure control deviation dp2 are determined. Then at S9A the first mixture throttle angle DKW1 and the second mixture throttle angle DKW2 are computed as a function of the first mixture pressure control deviation dp1 and the second mixture pressure control deviation dp2 and then output. At S9B the value of the set volume flow VSL is simultaneously supplied to the gas throttle. At S10 a check is made to determine whether the engine has stopped. If this is not the case, i.e., interrogation result S10: no, then program control is returned to point A, and the program continues at S1. If an engine shutdown is detected at S10, interrogation result S10: yes, then the program is terminated.

REFERENCE NUMBERS 1 gas engine
2 shaft
3 coupling
4 shaft
5 generator
6 gas throttle
7 mixer
8 compressor
9 cooler
10 first mixture throttle
11 second mixer throttle
12 first receiver tube
13 second receiver tube
14 electronic gas engine control unit (GECU)
15 system controller
16 speed controller
17 torque limiter 18 efficiency unit
19 mixture quantity unit
20 electronic processing unit
21 first closed-loop control system
22 second closed-loop control system
23 computing unit
24 first mixture pressure controller
25 first characteristic curve
26 second mixture pressure controller
27 second characteristic curve

The invention claimed is:

1. A method for automatically controlling a stationary gas engine, comprising the steps of: computing a speed control deviation (dn) from a set speed (nSL) and an actual speed (nIST); using the speed control deviation (dn) in a speed controller to determine a set torque (MSL) as a correcting variable; using the set torque (MSL) to determine a set volume flow (VSL); determining a mixture throttle angle (DKW1, DKW2), for determining a mixture volume flow (V1, V2) and for determining an actual mixture pressure (p1(IST), p2(IST)) in a receiver tube (12, 13) upstream of intake valves of the gas engine, as a function of the set volume flow (VSL); and determining a gas throttle angle, for determining a gas volume flow (VG) as a gas fraction in a gas/air mixture, as a function of the set volume flow (VSL).

2. A method in accordance with claim 1, wherein the set volume flow (VSL) is computed by limiting the set torque (MSL) and assigning the set volume flow (VSL) to the limited set torque (MSLB) by an engine map as a function of the actual speed (nIST).

3. The method in accordance with claim 2, including limiting the set torque as a function of the actual speed (nIST).

4. The method in accordance with claim 3, additionally including setting the torque limit as a function of a detected fault state of the system (FM) and a permissible mechanical maximum torque.

5. The method in accordance with claim 1, wherein the step of determining the mixture throttle angle (DKW1, DKW2) includes computing a set mixture pressure (pSL) from the set volume flow (VSL), determining a mixture pressure control deviation (dp1, dp2) from the set mixture pressure (pSL) and an actual mixture pressure (p1(IST), p2(IST)) in the receiver tube, and using the mixture pressure control deviation (dp1, dp2) to compute, by means of a mixture pressure controller, a correcting variable (QF1, QF2) for determining the mixture throttle angle (DKW1, DKW2).

6. The method in accordance with claim 5, wherein the computation of the set mixture pressure (pSL) also takes into account the actual speed (nIST), a constant set lambda (LAM (SL)), an engine stroke volume (VH), a volumetric efficiency (LG) corresponding to a cylinder cutoff, a mixture temperature (T1) in the receiver tube, a standard air pressure (pNORM), a standard temperature (TNORM), and a fuel quality (LMIN).

7. The method in accordance with claim 1, including for a V-type gas engine, computing a first mixture throttle angle (DKW1) for an A side of the engine for determining a first mixture volume flow (V1) and a first actual mixture pressure (p1(IST)) in a first receiver tube and computing a second mixture throttle angle (DKW2) for a B side of the engine for determining a second mixture volume flow (V2) and a second actual mixture pressure (p2(IST)) in a second receiver tube.

* * * * *